(12) United States Patent
Lille et al.

(10) Patent No.: US 7,268,973 B2
(45) Date of Patent: Sep. 11, 2007

(54) PERPENDICULAR MAGNETIC HEAD HAVING THERMALLY ASSISTED RECORDING ELEMENT

(75) Inventors: Jeffrey S. Lille, Sunnyvale, CA (US); Hugo Alberto Emilio Santini, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 497 days.

(21) Appl. No.: 10/627,396

(22) Filed: Jul. 24, 2003

(65) Prior Publication Data

US 2005/0018348 A1    Jan. 27, 2005

(51) Int. Cl.
G11B 5/147    (2006.01)

(52) U.S. Cl. .................. 360/125; 360/126

(58) Field of Classification Search ........... 360/125, 360/126
See application file for complete search history.

(56) References Cited

U.S. PATENT DOCUMENTS

| | | | | |
|---|---|---|---|---|
| 5,986,978 | A | 11/1999 | Rottmayer et al. | 369/13 |
| 6,011,664 | A | 1/2000 | Kryder et al. | 360/59 |
| 6,016,290 | A * | 1/2000 | Chen et al. | 369/13.17 |
| 6,088,204 | A | 7/2000 | Farrow et al. | 360/327 |
| 6,233,206 | B1 | 5/2001 | Hamann et al. | 369/13 |
| 6,317,280 | B1 | 11/2001 | Nakajima et al. | 360/59 |
| 6,333,827 | B1 | 12/2001 | Hamamoto et al. | 360/59 |
| 6,367,924 | B1 | 4/2002 | Sato et al. | 347/105 |
| 6,392,832 | B1 | 5/2002 | Oshiki et al. | 360/59 |
| 6,493,183 | B1 | 12/2002 | Kasiraj et al. | 360/126 |
| 6,636,460 | B2 * | 10/2003 | Akiyama et al. | 369/13.14 |
| 6,665,136 | B2 * | 12/2003 | Clinton et al. | 360/55 |
| 6,671,127 | B2 * | 12/2003 | Hsu et al. | 360/123 |
| 6,873,576 | B1 * | 3/2005 | Van Kesteren | 369/13.17 |
| 6,940,691 | B2 * | 9/2005 | Maat | 360/126 |
| 7,006,336 | B2 * | 2/2006 | Coffey et al. | 360/313 |
| 7,068,453 | B2 * | 6/2006 | Terris et al. | 360/59 |
| 7,187,520 | B2 * | 3/2007 | Lee et al. | 360/126 |
| 2001/0006435 | A1 | 7/2001 | Ichihara et al. | 360/55 |
| 2002/0008930 | A1 | 1/2002 | Shimoda et al. | 360/59 |
| 2002/0057511 | A1 | 5/2002 | Kikitsu et al. | 360/59 |
| 2003/0021191 | A1 | 1/2003 | Hsu et al. | 369/13.17 |
| 2003/0043699 | A1 | 3/2003 | Isshiki et al. | 369/13.33 |
| 2003/0128633 | A1 | 7/2003 | Batra et al. | 369/13.32 |

FOREIGN PATENT DOCUMENTS

| | | |
|---|---|---|
| JP | 57113406 A | 7/1982 |
| JP | 02037501 A | 2/1990 |
| JP | 2002133608 A | 5/2002 |

* cited by examiner

*Primary Examiner*—Brian E. Miller
(74) *Attorney, Agent, or Firm*—Robert O. Guillot; Intellectual Property Law Offices

(57) ABSTRACT

A perpendicular magnetic head including a media heating element that is fabricated within the magnetic head structure. The heating element is preferably fabricated above the first magnetic pole layer close to the ABS surface of the head. In one embodiment, following the fabrication of the heating element, a second magnetic pole probe layer that includes the second magnetic pole tip is fabricated. In an alternative head embodiment, a second magnetic pole shaping layer is fabricated upon the heating element, followed by the fabrication of the probe layer that includes the second magnetic pole tip. The heating element is an electrically resistive heating element that is preferably comprised of NiCr or NiFe.

8 Claims, 4 Drawing Sheets

PERPENDICULAR MAGNETIC HEAD HAVING THERMALLY ASSISTED RECORDING ELEMENT

BACKGROUND OF THE INVENTION

1. Field of the Invention

The present invention relates generally to magnetic heads that are utilized with thin film hard disk data storage devices, and more particularly to the design and fabrication of a perpendicular magnetic head having a storage media heating element formed adjacent to a second magnetic pole tip of the write head components of the magnetic heads.

2. Description of the Prior Art

Hard disk drives generally include one or more rotatable data storage disks having a magnetic data storage layer formed thereon. Data in the form of small magnetized areas, termed magnetic data bits, is written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

Generally, magnetic bits can be created where the magnetic field direction of each bit is either in the plane of the magnetic layer or perpendicular to the plane of the magnetic layer. Magnetic heads that form magnetic bits having in plane magnetic fields are termed longitudinal magnetic heads, whereas magnetic heads that form bits having a magnetic field that is perpendicular to the plane of the magnetic layer are termed perpendicular heads. The present invention relates particularly to perpendicular magnetic heads.

The continual quest for higher data recording densities of the magnetic media demands smaller bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. Present methods to delay the onset of this limit in storage media include fabricating smaller magnetic grains that are decoupled from each other and which have very high coercivity. Additionally, write head technology methods include the use of higher magnetic moment materials, and using thermally assisted recording heads. The present invention relates to such thermally assisted recording heads in which a heating device is disposed within the magnetic head. Heat from the magnetic head temporarily reduces the localized coercivity of the media, such that the magnetic head is able to record data bits within the magnetic media. Once the disk returns to ambient temperature, the very high coercivity of the magnetic media provides the bit latency necessary for the recorded data disk.

In order to realize maximum advantage from perpendicular recording, there is a need for a write head that provides pole flux density near the saturation flux density of the head material, a pole thickness approximately equal to the trackwidth, a device to thermally heat the disk, and an efficient yoke design.

SUMMARY OF THE INVENTION

An embodiment of perpendicular magnetic head of the present invention includes a media heating element that is fabricated within the magnetic head structure following the fabrication of the read head element of the magnetic head. The media heating element is preferably fabricated above the first magnetic pole layer close to the ABS surface of the head. In one head embodiment, following the fabrication of the heating element, a second magnetic pole probe layer that includes the second magnetic pole tip is fabricated. In an alternative head embodiment, the second magnetic pole shaping layer is fabricated upon the heating element, followed by the fabrication of the probe layer that includes the second magnetic pole tip. The heating element is an electrically resistive heating element that is preferably comprised of NiCr or NiFe. The media heating element serves to heat the magnetic media immediately prior to the passage of the magnetic media beneath the pole tip. The heating of the media lowers its localized coercivity, which facilitates the writing of data to the media by the write head element of the magnetic head.

It is an advantage of the perpendicular magnetic head of the present invention that it includes a media heating element to facilitate the writing of data to a magnetic disk.

It is another advantage of the perpendicular magnetic head of the present invention that the heating element is disposed beneath a second magnetic pole tip of the magnetic head, such that the media is heated by the heating element prior to its passage below the pole tip.

It is a further advantage an of embodiment of the perpendicular magnetic head of the present invention that the heating element is disposed beneath a P2 pole tip of the magnetic head, such that the P2 pole tip can absorb heat from the heating element and radiate the heat to the media passing beneath the P2 pole tip.

It is yet another advantage of an embodiment of the perpendicular magnetic head of the present invention that the heating element is disposed in a layer spaced apart from a P2 pole tip of the magnetic head, such that the heating element can radiate the heat to the media passing beneath it prior to the passage of the P2 pole tip.

It is an advantage of the hard disk drive of the present invention that it includes a perpendicular magnetic head having a media heating element, whereby higher data areal storage densities of the hard disk drive can be obtained.

It is another advantage of the hard disk drive of the present invention that it includes a perpendicular magnetic head having a media heating element, whereby data storage disks having a higher coercivity can be written upon.

It is a further advantage of the hard disk drive of the present invention that it includes a perpendicular magnetic head having a heating element that is disposed beneath a second magnetic pole tip of the magnetic head, such that the media is heated by the heating element prior to its passage beneath the pole tip of the magnetic head.

It is yet another advantage of the hard disk drive of the present invention that it includes a magnetic head having a heating element that is disposed in a layer spaced apart from a P2 pole tip of the magnetic head, such that the heating element can radiate the heat to the media passing beneath it prior to the passage of the P2 pole tip.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

DETAILED DESCRIPTION OF THE PREFERRED EMBODIMENTS

Figure 1:
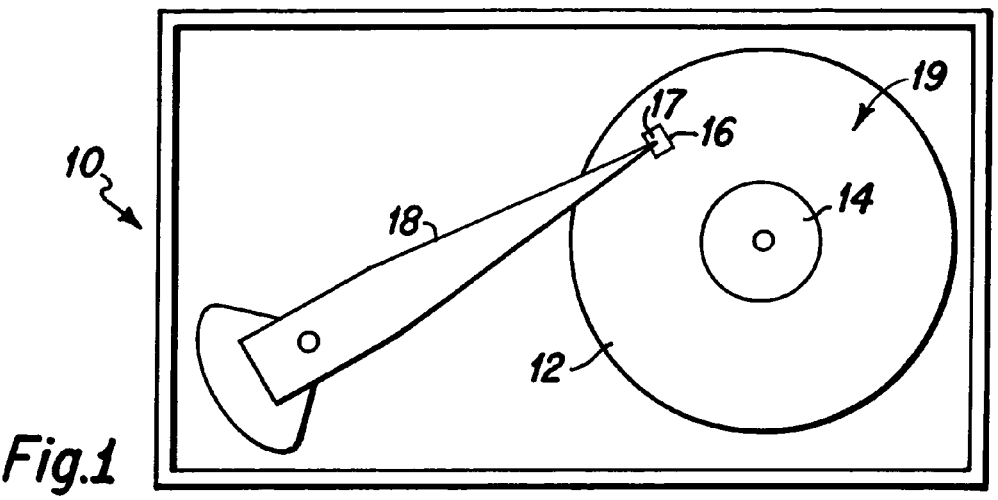
FIG. 1 is a schematic top plan view of a hard disk drive including the magnetic head of the present invention.

The magnetic head of the present invention is utilized to read and write data to magnetic media, such as a hard disk in a hard disk drive. A simplified top plan view of a hard disk drive 10 is presented in FIG. 1, wherein at least one magnetic media hard disk 12 is rotatably mounted upon a spindle 14. A magnetic head 16 of the present invention is formed upon a slider 17 that is mounted upon an actuator arm 18 to fly above the surface 19 of each rotating hard disk 12, as is well known to those skilled in the art.

Figure 2:
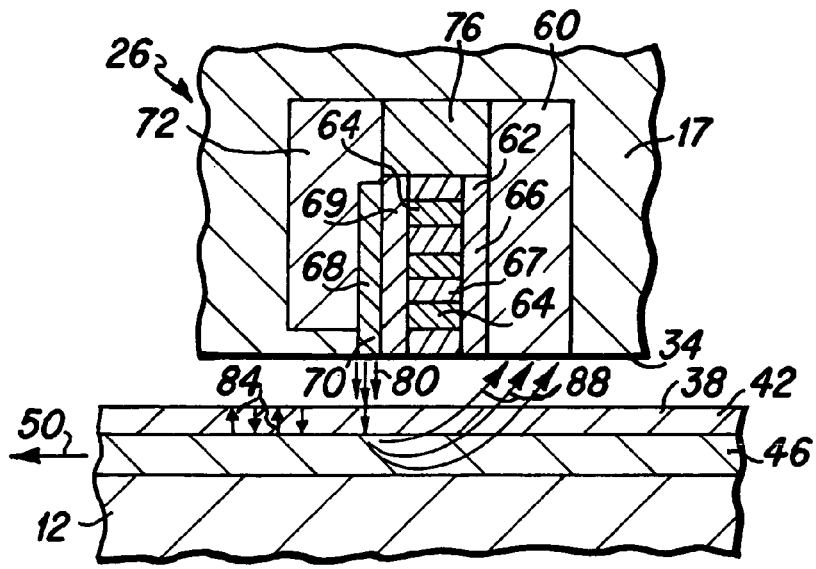
FIG. 2 is a side cross-sectional view depicting various components of a prior art perpendicular magnetic head.

FIG. 2 is a side cross-sectional diagram of a typical prior art perpendicular write head portion 26 of a magnetic head which serves as a basis for the description of the improved perpendicular write head of the present invention which follows. As depicted in FIG. 2, a slider 17 having an air bearing surface (ABS) 34 is shown in a data writing position above the surface 38 of a hard disk 12. The disk 12 includes a high coercivity magnetic layer 42 that is fabricated on top of a magnetically soft underlayer 46. In FIG. 2, the disk 12 is moving towards the left (arrow 50) relative to the stationary slider 17.

The perpendicular head 26 includes a first magnetic pole (P1) 60 upon which has been fabricated an induction coil structure 62, including induction coil turns 64 that are typically formed upon an electrical insulation layer 66 and within filling insulation 67, and with a further insulation layer 69 that is formed on top of the coil turns 64. A thin probe layer 68 that includes a second magnetic pole tip 70 is fabricated on top of the induction coil structure 62. A second magnetic pole layer, termed a shaping layer 72, is fabricated on top of and in magnetic flux flow communication with the probe layer 68. A magnetic back gap piece 76 joins the upper portions of the P1 pole 60 and the shaping layer 72, such that magnetic flux can flow between them. As is well understood by those skilled in the art, electrical current flowing through the induction coil 64 will cause magnetic flux to flow through the magnetic poles of the head, where the direction of magnetic flux flow depends upon the direction of the electrical current through the induction coil. For instance, current in one direction will cause magnetic flux to flow through the shaping layer 72 downwardly (see arrow 80) through the narrow P2 pole tip 70 into the high coercivity magnetic layer 42 of the hard disk 12. This magnetic flux 80 causes magnetized data bits to be recorded in the high coercivity layer 42 where the magnetic field of the data bits is perpendicular (see arrows 84) to the surface 38 of the disk 12. The magnetic flux then passes through the high coercivity layer 42 and flows into the magnetically soft underlayer 46 and disburses towards the P1 pole 60. The magnetic flux then flows upwardly (see arrows 88) into the P1 pole 60 and then through the back gap piece 76 to the shaping layer 72, thus completing a magnetic flux circuit. In such perpendicular write heads, it is significant that at the ABS the P1 pole 60 is much larger than the pole tip 70 such that the density of the magnetic flux passing upwardly (see arrows 88) through the high coercivity magnetic layer 42 is greatly reduced and will not magnetically affect, or flip, the magnetic field of data bits on the hard disk, such as bits on data tracks adjacent to the track being written upon. As is known to those skilled in the art, the size and shape of the induction coil 64 and the P1 pole 60 may vary in different write head designs. Additionally, write head designs are known in which a large magnetic pole, such as the P1 pole, can be located to follow the writing pole (that is the second magnetic pole with its pole tip) as data is written on the rotating magnetic disk.

A significant feature of the perpendicular write head is that the distance between the P1 pole 60 and the P2 pole tip 70 is not as critical a dimension as it is in longitudinal write heads, where a P1 pole is separated from a P2 pole tip by a very thin write gap layer, and data bits are formed with a magnetic field direction that is in the plane of the high coercivity layer.

Figure 3:
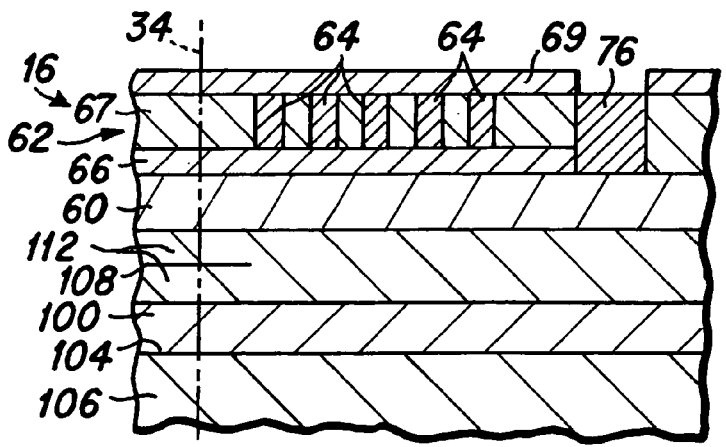
FIGS. 3-7 depict a perpendicular magnetic head of the present invention that includes a media heating element.

FIG. 3 is a side cross-sectional view of a step in the fabrication of the perpendicular magnetic head 16 of the present invention. The features shown in FIG. 3 are a part of prior art perpendicular heads such as head 26 and serve as a basis for understanding the fabrication process of the present invention. As depicted in FIG. 3, a first magnetic shield (S1) 100 is fabricated upon a slider substrate surface 104. A read head element 108 is then fabricated within electrically insulative layers 112, and a second magnetic shield (S2) 60, which may or may not also function as a first magnetic pole (P1) 60 in a type of magnetic head termed a merged head, is fabricated on top of the read head insulation layers 112. It is also possible to have S2 and P1 60 be magnetically separate layers in a magnetic head that is typically referred to as piggyback head, and the present invention is suitable for use with a merged head or piggyback head. Thereafter, an induction coil structure 62, shown as five induction coil turns 64, is fabricated upon an electrical insulation layer 66 that is fabricated on top of the P1 pole 60, using standard fabrication techniques, such as photolithographic and electroplating processing techniques. A back gap piece 76, composed of a magnetically conductive material such as permalloy, may next be fabricated in magnetic connection with the P1 pole 60. Thereafter, gaps adjacent to the coil turns 64 and magnetic structure are filled with an electrical insulation 67. The upper surface of the induction coil and back gap piece are then typically planarized, such as through a chemical mechanical polishing (CMP) step, and a patterned electrical insulation layer 69 is deposited on top of the induction coil structure 62.

Figure 4:
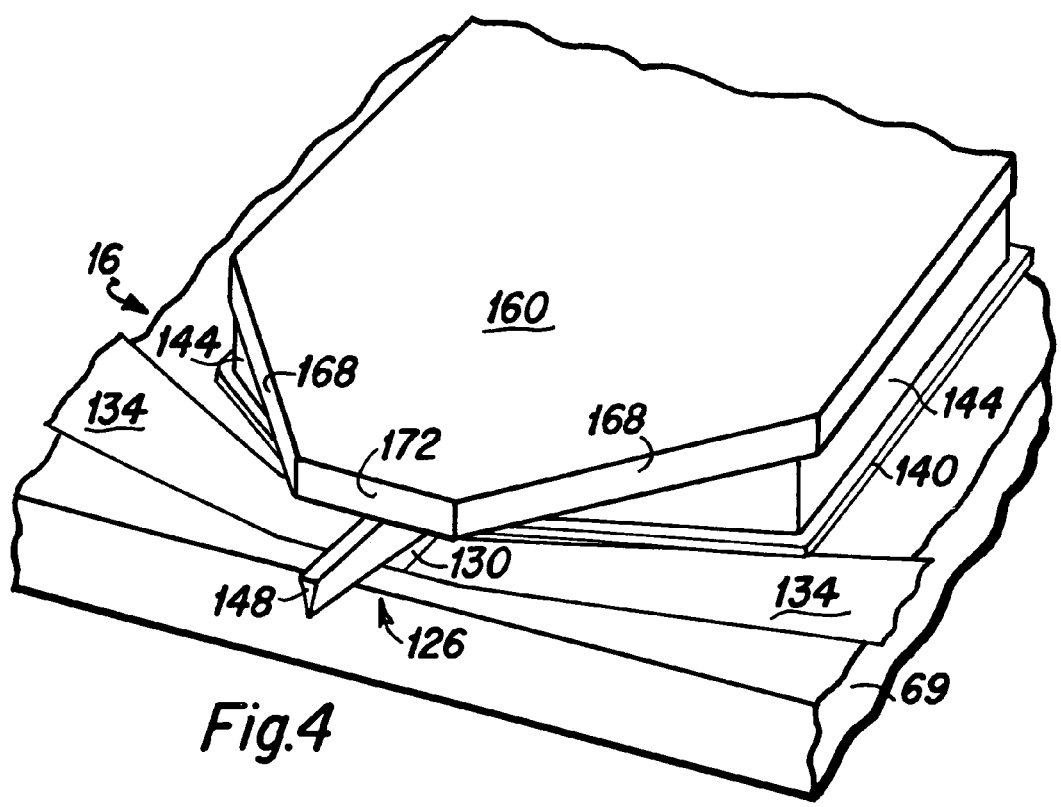
Figure 5:
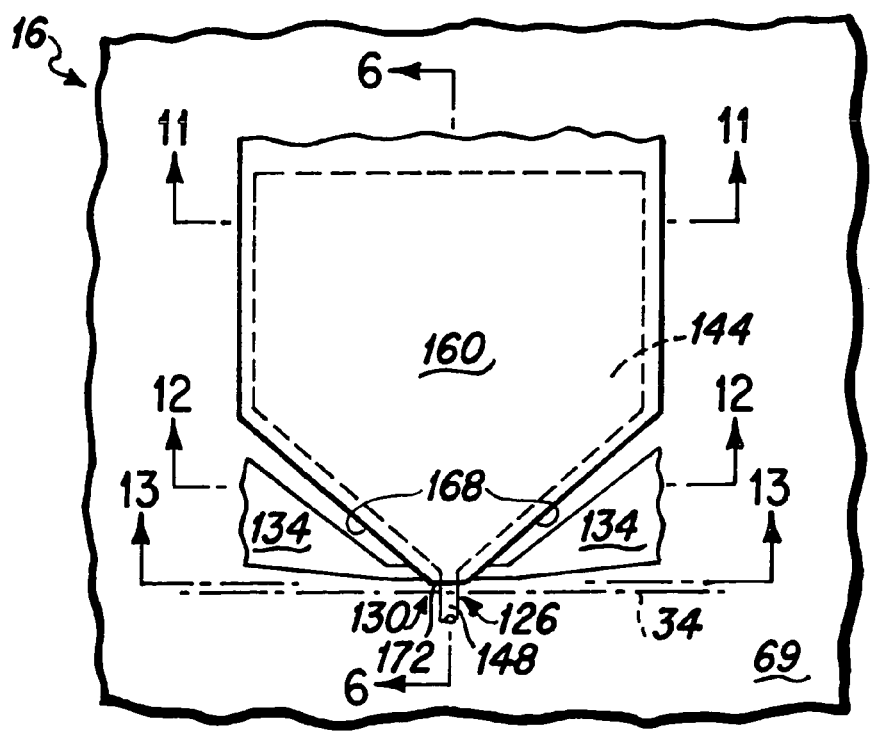
Figure 6:
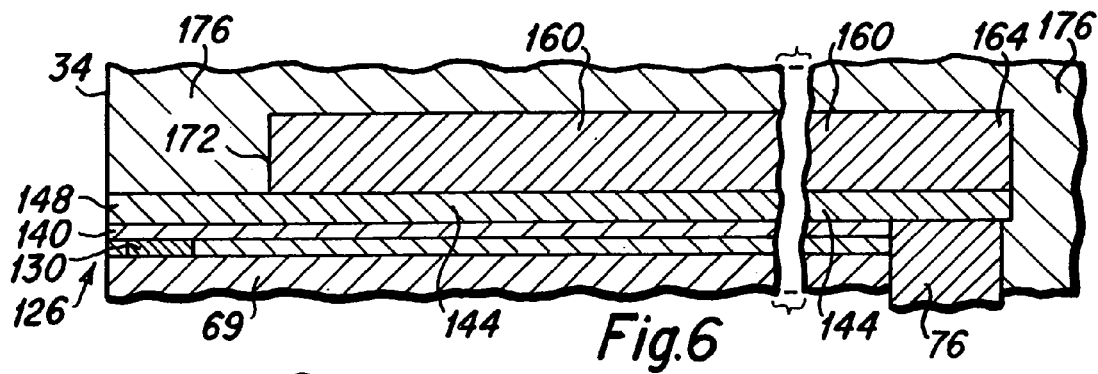
Figure 7:
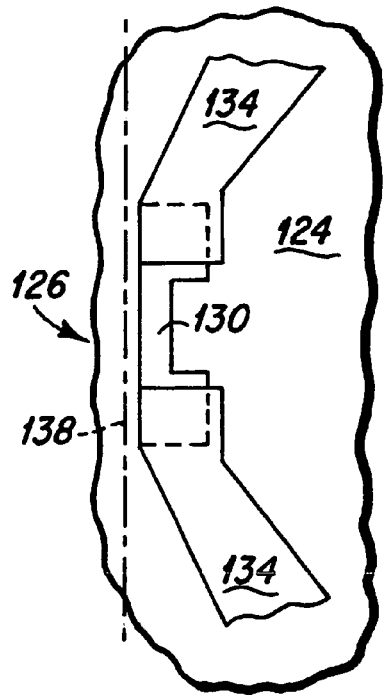

As has been indicated hereabove, the present invention is a perpendicular magnetic head including a heater element that provides thermal assistance in recording data bits to high coercivity magnetic media. A first embodiment of a perpendicular magnetic head 16 of the present invention is next depicted in FIGS. 4, 5, 6 and 7, wherein FIG. 4 is a perspective view depicting significant components of the head, FIG. 5 is a top plan view of the head depicted in FIG. 4, FIG. 6 is a cross-sectional view taken along lines 6-6 of FIG. 5, and FIG. 7 is a top plan view of the heater element depicted in FIGS. 4-6. As depicted in FIGS. 4-7, a heater structure 126 is next fabricated on top of the insulation layer 69. The heater structure 126 may be fabricated using well known photolithographic techniques in which an electrically resistive heater element 130 and electrical leads 134 to the heater element are successively fabricated. A detailed description of the fabrication of such a heater element is provided in copending U.S. patent application Ser. No. 10/791,186, filed Mar. 1, 2004, entitled: Magnetic Head Having Thermally Assisted Recording Device, and Method of Fabrication Thereof, the disclosure of which is incorporated herein as though set forth in full. Basically, the heater structure 126 includes a central electrically resistive heater 130 that is fabricated beneath the location in which the pole tip will subsequently be fabricated. It is desirable that the active heating portion 130 of the heater be approximately as wide as the track width of the pole tip because it is undesirable to heat portions of the magnetic media disposed on data tracks that are adjacent to the track that is being written upon. As is seen in FIGS. 4-7, the heating element 130 may be fabricated first, followed by the electrical lead elements 134 that project laterally from the heating element. It is desirable, though not necessary, that the heating element 130 be fabricated slightly away from the air bearing surface (ABS) 34 of the head, to limit corrosion of the heater element and possible electrical discharge from the heater element to the media disk during a writing operation.

Following the fabrication of the heater structure 126, an electrical insulation layer 140, such as alumina, is deposited across the surface of the wafer. Following the deposition of the insulation layer 140, a probe layer 144 including a second magnetic pole tip 148 will next be fabricated. The wafer should preferably have a planar surface which is helpful in accurately fabricating the small pole tip 148. The probe layer 144 may be fabricated utilizing photolithographic techniques and is preferably comprised of a high magnetic moment material such as a CoFe alloy.

Following the fabrication of the probe layer 144, a second magnetic pole layer, termed a shaping layer 160, is fabricated utilizing standard photolithographic and electroplating techniques. The shaping layer is preferably formed of NiFe in at. % combination such as 45/55 or 80/20. The rearward end 164 of the shaping layer 160 is formed in magnetic flux communication with the back gap piece 76, and the forward side edges 168 of the shaping layer are sloped inwardly towards the ABS 34 and pole tip 148 to aid and shape the flow of magnetic flux towards the pole tip 148. The frontward end 172 of the shaping layer 160 is formed away from the ABS 34 to prevent magnetic flux leakage directly to the disk 12, such that magnetic flux from the shaping layer 160 is channeled through the pole tip 148. Following the fabrication of the shaping layer 160, further magnetic head fabrication steps, such as the fabrication of electrical interconnects (not shown), are accomplished, as are well known to those skilled in the art, and the magnetic head is subsequently encapsulated, such as with the deposition of an alumina layer 176. Thereafter, the wafer is sliced and polished into magnetic heads, the ABS surface of the heads is carefully polished and lapped and the discrete magnetic heads are ultimately formed.

As indicated above, the desire to increase the areal data storage density of hard disks results in a desire to write data with ever smaller data bits, and therefore the need to fabricate write heads with ever smaller pole tips. When creating such very small pole tips, it can be desirable to limit the number of fabrication steps that are conducted subsequent to the fabrication of the small pole tip, because each fabrication step brings with it the further chance that the pole tip will be damaged in some manner during these subsequent fabrication steps. As will be understood from the following description, the pole tip can be fabricated subsequent to the fabrication of the shaping layer, whereby fewer write head fabrication steps are undertaken following the fabrication of the pole tip.

Figure 8:
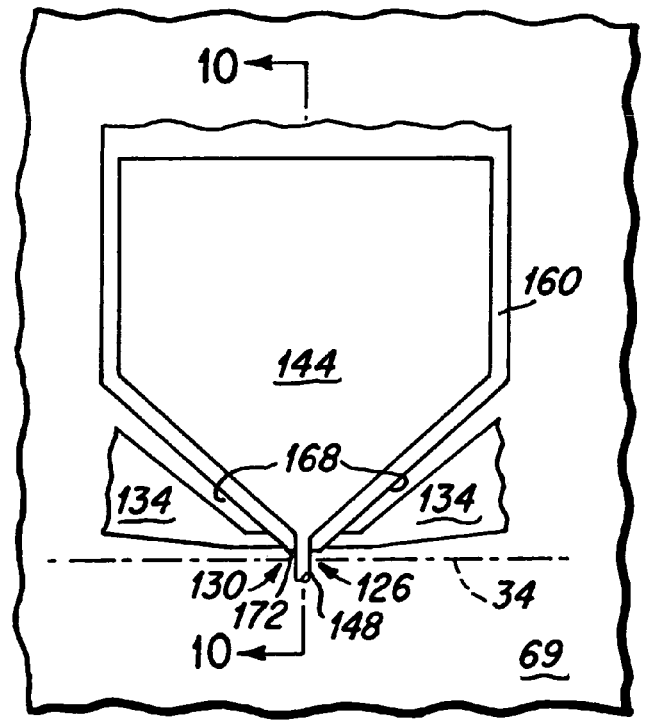
FIGS. 8 and 9 depict an alternative perpendicular magnetic head of the present invention that includes a media heating element.
Figure 9:
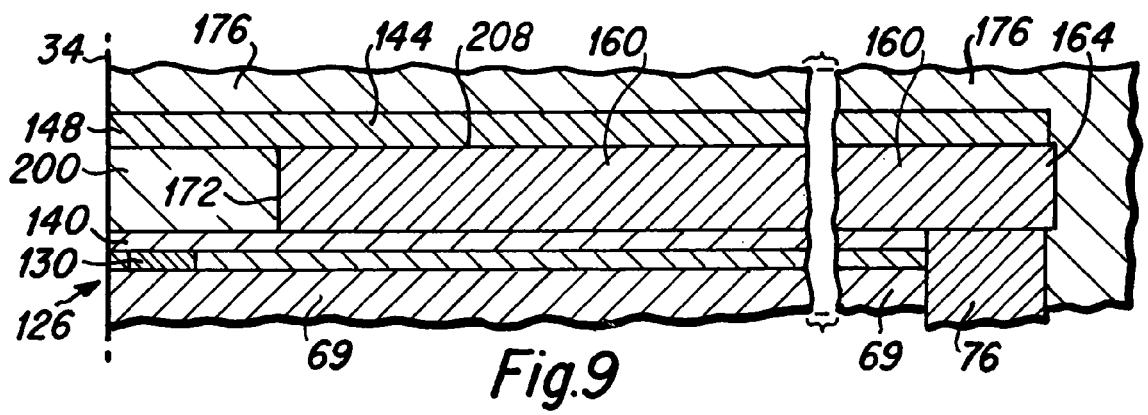

This further embodiment of the present invention is next presented in FIGS. 8 and 9, wherein FIG. 8 is a top plan view and FIG. 9 is a side cross-sectional view taken along lines 9-9 of FIG. 8. As depicted in FIGS. 8 and 9, a heater structure 126 is first fabricated upon the insulation layer 69 that is fabricated above the induction coil structure, as is depicted in FIG. 3 and described hereabove. The electrical heater structure 126 is substantially similar to the heater structure 126 depicted in FIGS. 4-7, as described hereabove, and it includes a central electrically resistive heater element 130 and electrical leads 134 for supplying current to the heater element. Following the fabrication of the heater structure 126 a layer of alumina 140 is deposited across the surface of the wafer, which may be, though not necessarily followed by a CMP step. Following the deposition of the insulation layer 140, a shaping layer 160 is next fabricated. The rearward portion 164 of the shaping layer 160 is fabricated in magnetic flux communication with the back gap piece 76, and the forward portion 172 of the shaping layer is fabricated away from the ABS 34, and with sloped side surfaces 168, as was described hereabove with the aid of FIGS. 4-7. Following the fabrication of the shaping layer 160, alumina 200 is deposited across the surface of the wafer which results in filling the areas in front of the shaping layer 160 at the ABS 34. A CMP step may be next conducted to form a planar surface and expose the upper surface 208 of the shaping layer 160. The probe layer 144 including the pole tip 148 is next fabricated in magnetic flux communication with the shaping layer 160.

In comparing the magnetic head embodiments of FIGS. 4-7 and 8-9, it will be understood that a significant difference between them is the distance between the heater element 130 and the pole tip 148. Specifically, in the head embodiment depicted in FIGS. 4-7, the heater element 130 is located close to the pole tip 148 with only the insulation layer 140 therebetween, whereas in the magnetic head embodiment depicted in FIGS. 8 and 9, the heater element 130 is separated from the pole tip 148 by the thickness of the shaping layer 160 plus the insulation layer 140. The significance of the separation between the heater element 130 or 188 and the pole tip 148 relates to the efficiency with which the heater element can heat the magnetic layer 42 of the media 12 to the appropriate temperature, prior to the passage of the magnetic media beneath the pole tip. That is, depending upon the rotational speed of the magnetic disk 12 and the heating capabilities of the heating element, as well as various heat transfer parameters, it may be an advantageous head design for the heating element to be located close to the pole tip (FIGS. 4-7), or it may be operationally superior that the heating element 130 be separated from the pole tip 148 by a distance such as the thickness of the shaping layer 160 plus insulation layer 140 (FIGS. 8 and 9).

Figure 10:
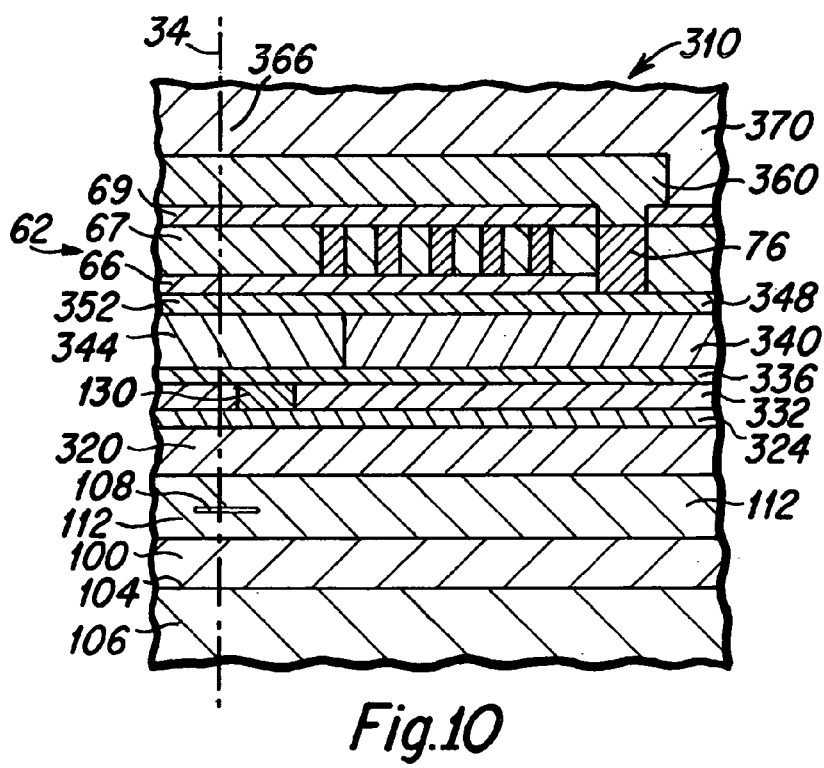
FIG. 10 depicts an alternative perpendicular magnetic head of the present invention in which the pole tip is fabricated within the first magnetic pole.

As will be well understood by those skilled in the art after having read the preceding detailed description of the present invention, a magnetic head can also be fabricated in which the novel features of the probe layer and pole tip fabrication of the present invention are applied to the first magnetic pole, and the second magnetic pole is formed similarly to the first magnetic pole; that is, without a pole tip. Specifically, as depicted in FIG. 10, following the fabrication of the read head element 108 within electrically insulative layers 112 (as described hereabove with regard to FIG. 3), a second magnetic shield (S2) 320 is fabricated on top of the insulation layers 112. As will be understood by those skilled in the art, the second magnetic shield 320 in the embodiment depicted in FIG. 10 does not function as a first magnetic pole, such that the device depicted in FIG. 10 is appropriately termed a piggyback head.

Following the fabrication of the second magnetic shield 320, a heater element, such as heater element 130 described hereabove, is fabricated. Specifically, an insulation layer 324 is deposited upon the second magnetic shield 320, followed by the fabrication of the heater element 130 within an insulation layer 332, and a further insulation layer 336 is then fabricated upon the heater element 130. Thereafter, a first magnetic pole shaping layer 340 is fabricated upon the insulation layer 336, such that a quantity of nonmagnetic material 344 is fabricated between the ABS surface 34 and the shaping layer 340. The shaping layer 340 and nonmagnetic material 344 may be fabricated similarly to shaping layer 160 and nonmagnetic material layer 200 depicted in FIG. 9 and described hereabove. Thereafter, a probe layer 348 is fabricated upon the shaping layer 340 and the nonmagnetic material layer 344, and in magnetic flux communication with the shaping layer 340. A narrow pole tip 352 of the probe layer 348 is fabricated at the ABS surface 34. The probe layer 348 and pole tip 352 may be similar to the probe layer 144 and pole tip 148 depicted in FIG. 9 and described hereabove. Following the fabrication of the probe layer 348, an insulation layer 66 is deposited, followed by the fabrication of an induction coil structure 62, as described above. Thereafter, a second magnetic pole 360, having an enlarged surface 366 exposed at the ABS surface 34 is fabricated upon the induction coil structure 62. A back gap piece 76 is fabricated between the second magnetic pole and the first magnetic pole to facilitate magnetic flux flow therebetween. After fabricating further magnetic head structures as are well known to those skilled in the art, such as electrical interconnects, the magnetic head structure is encapsulated such as by the deposition of a layer of alumina 370. In this embodiment, the heater element is fabricated prior to the fabrication of the first magnetic pole and its associated pole tip 352, such that the heater element 130 will heat portions of the disk media prior to those portions passing beneath the pole tip 352 associated with the first magnetic pole.

It is therefore to be understood that the present invention includes a perpendicular magnetic head design and a preferred method of fabrication to achieve a very high recording density at very high data rates. The recording density can be achieved, as described above, within a better resolving media (BPI), and is improved by decreasing the width of the recording probes (TPI) with the advantage of writing on higher coercivity media. The heater that is incorporated into the perpendicular head of the present invention is of similar dimensions to the write head pole tip. Because of this design, the probe thickness needs to be now a fraction of the one needed for longitudinal recording.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A perpendicular magnetic head, comprising:
a first magnetic pole having a portion thereof that is exposed at an air bearing surface (ABS) of the magnetic head;
a second magnetic pole including a pole tip thereof that is exposed at said ABS;
a heating element;
an induction coil structure that is disposed between said first magnetic pole and said second magnetic pole, wherein said induction coil structure includes a plurality of coil turns and an insulation layer that is disposed upon said coil turns; and
wherein said heating element is disposed between said insulation layer and said pole tip.

2. A perpendicular magnetic head as described in claim 1 wherein said second magnetic pole includes a shaping layer that is disposed in magnetic flux communication with said first magnetic pole, and a probe layer which includes said pole tip, wherein said probe layer is disposed in magnetic flux communication with said shaping layer.

3. A perpendicular magnetic head as described in claim 2 wherein said shaping Layer is disposed between said heating element and said pole tip.

4. A perpendicular magnetic head as described in claim 2 wherein said probe layer is disposed between said heating element and said shaping layer.

5. A hard disk drive including a perpendicular magnetic head, comprising:
a media disk being adapted for rotation in a first direction;
said magnetic head including:
a write head element including a magnetic pole having a pole tip portion thereof that is exposed at an air bearing surface (ABS) of the magnetic head, and disposed to write magnetic bits to portions of said media disk;
a heating element being disposed proximate said pole tip, such that said heating clement is disposed to heat said portions of said magnetic disk prior to the writing of said magnetic bits to said portions of said media disk;
another magnetic pole having a portion thereof that is exposed at said ABS;
an induction coil structure that is disposed between said magnetic pole and said another magnetic pole, wherein said induction coil structure includes a plurality of coil turns and an insulation layer that is disposed upon said coil turns; and
wherein said heating element is disposed between said insulation layer and said pole tip.

6. A hard disk drive as described in claim 5 wherein said magnetic pole includes a shaping layer that is disposed in magnetic flux communication with said another magnetic pole, and a probe layer which includes said pole tip, wherein said probe layer is disposed in magnetic flux communication with said shaping layer.

7. A hard disk drive as described in claim 6 wherein said shaping layer is disposed between said heating element and said pole tip.

8. A hard disk drive as described in claim 6 wherein said probe layer is disposed between said heating element and said shaping layer.

* * * * *